Sept. 2, 1930.   G. L. TARBOX ET AL   1,775,055
METHOD OF MAKING TUBE JOINTS
Filed May 31, 1929
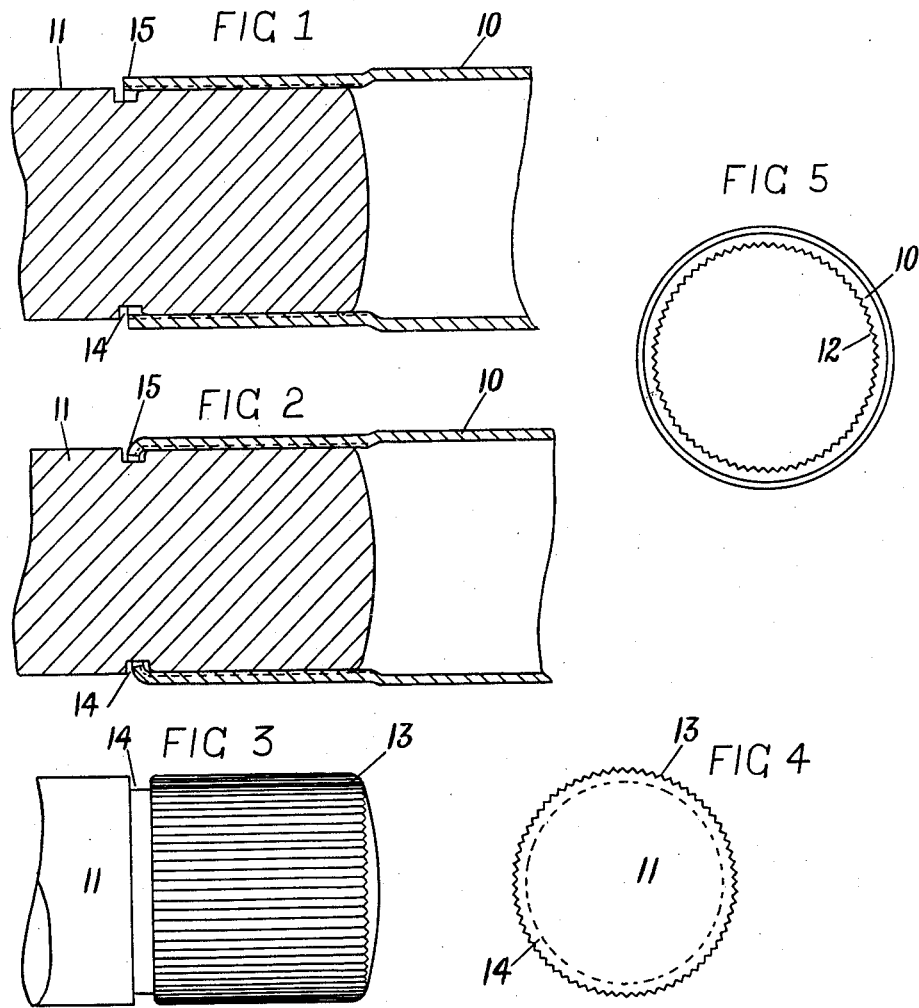
GURDON LUCIUS TARBOX
CLARENCE WINFRED SPICER
INVENTORS.
BY
ATTORNEY Patented Sept. 2, 1930

1,775,055

UNITED STATES PATENT OFFICE

GURDON LUCIUS TARBOX AND CLARENCE WINFRED SPICER, OF PLAINFIELD, NEW JERSEY

METHOD OF MAKING TUBE JOINTS

Application filed May 31, 1929. Serial No. 367,564.

Our invention relates to the method of making tube joints especially of joints wherein an outer tubular member is fastened to an inner shaft member by a pressed fit, and has for its object to produce a method of forming a joint which will be durable and will readily withstand the blows and vibrations of rough usage without loosening or becoming disabled.

Joints of this character have been constructed before in which the outer tubular member has been pressed into depressions formed on the inner shaft member. These joints have been unsatisfactory because the depressed portion cannot be made to fill the depressions completely because of the elasticity of the materials used. The elasticity of the tube prevents any forming or swaging of the tube to closely fit the depressions formed on the inner member and the principal object of our invention is to overcome these disadvantages.

The foregoing and other features of our invention will now be described in connection with the accompanying drawing forming part of this application in which we have represented our joint in its preferred form, after which we shall point out in the claims those features which we believe to be new and of our joint invention.

Figure 1 is a sectional elevation of our joint.

Figure 2 is a modified form thereof.

Figure 3 is a side view of our inner member.

Figure 4 is an end view of same.

Figure 5 is an end view of our tube.

In the carrying out of our invention we employ tubes 10 which may be swaged over a mandrel which is slightly smaller than the inner shaft 11 to which the tube is to be attached. The mandrel produces a serrated interior of the tube 12 which is adapted to press fit on the serrated end 13 of inner shaft member 11. The shaft member 11 is provided with an annular groove or notch 14 into which the end 15 of the tube 10 may be rolled. This last step in the process is to prevent the joint from coming apart when exposed to excessive end pull.

In forming the serrated portion of the tube 10 the tube may be reduced in size and the serrations be broached but as this weakens the tube it is not preferred. This method provides for the formation of a tube whose interior is a complement of the exterior of the shaft member only a trifle smaller so that a perfect press fit is assured.

We wish it distinctly understood that our method herein described is in the form in which we desire to use it but that changes or variations may be made as may be convenient or desirable without departing from the salient features of our invention and we therefore intend the following claims to cover such modifications as naturally fall within the lines of invention.

We claim:

1. The method of jointing an outer tubular member to an inner member, which consists in forming the inner member with serrations, said serrations in cross section being slightly larger than the inner cross section of the tubular outer member; swaging the outer tubular member to reduce its size over an arbor slightly smaller than the inner member and fitting the outer member with a press fit on the inner member.

2. The method employed in claim 1 with the addition of providing the inner member with a depression and rolling the outer member into said depression in the inner member.

3. The method of uniting a shaft stub and a tubular shaft consisting of forming the stub shaft with an annular groove surrounding the shaft and with a serrated end; reducing the diameter of the tube by swaging the tube to a size smaller than the serrated end of the shaft; press fitting the tube to the shaft and rolling the end of the shaft into the annular groove.

In testimony whereof we affix our signatures.

CLARENCE WINFRED SPICER.
GURDON LUCIUS TARBOX.